(12) United States Patent
Nolte et al.

(10) Patent No.: US 9,150,730 B2
(45) Date of Patent: Oct. 6, 2015

(54) PARTICULATE WAX COMPOSITES AND METHOD FOR THE PRODUCTION THEREOF AND THE USE THEREOF

(75) Inventors: Ulrich Nolte, Kleve (DE); Michael Berkei, Haltern am See (DE); Thomas Sawitowski, Essen (DE)

(73) Assignee: BYK—Chemie GmbH, Wesel (DE)

( * ) Notice: Subject to any disclaimer, the term of this patent is extended or adjusted under 35 U.S.C. 154(b) by 737 days.

(21) Appl. No.: 12/989,167

(22) PCT Filed: Mar. 26, 2009

(86) PCT No.: PCT/EP2009/002217
§ 371 (c)(1),
(2), (4) Date: Mar. 4, 2011

(87) PCT Pub. No.: WO2009/129908
PCT Pub. Date: Oct. 29, 2009

(65) Prior Publication Data
US 2011/0165207 A1   Jul. 7, 2011

(30) Foreign Application Priority Data
Apr. 25, 2008   (DE) .................. 10 2008 021 006

(51) Int. Cl.
*A61K 8/92* (2006.01)
*A61K 47/02* (2006.01)
*C09D 191/06* (2006.01)
*B82Y 5/00* (2011.01)
*C09C 1/00* (2006.01)
*B82Y 30/00* (2011.01)

(52) U.S. Cl.
CPC ............... *C09C 1/0081* (2013.01); *B82Y 30/00* (2013.01); *C09C 1/0084* (2013.01); *C01P 2004/61* (2013.01); *C01P 2004/62* (2013.01); *C01P 2004/64* (2013.01); *Y10T 428/2982* (2015.01)

(58) Field of Classification Search
CPC ... B82Y 30/00; C01P 2004/61; C09C 1/0081; C09C 1/0084; C12Q 1/6886; C12Q 2600/154
USPC .......... 424/401, 403; 514/769; 428/402, 403; 106/270; 977/773, 902
See application file for complete search history.

(56) References Cited

U.S. PATENT DOCUMENTS

| | | | | |
|---|---|---|---|---|
| 5,610,199 A | * | 3/1997 | Cohen et al. ................. | 514/721 |
| 5,660,865 A | * | 8/1997 | Pedersen et al. ............... | 426/99 |
| 7,153,573 B2 | * | 12/2006 | Tsuji et al. .................... | 428/403 |
| 2006/0147828 A1 | * | 7/2006 | Yuasa ........................ | 430/108.4 |

OTHER PUBLICATIONS

Report for Acetylate Lanolin Alcohol and Related Compounds (JEPT 4(4): 63-92, 1980).*

* cited by examiner

*Primary Examiner* — Anoop Singh
*Assistant Examiner* — Anna Falkowitz

(57) ABSTRACT

The invention relates to inorganic-organic composite particles, in particular composite nanoparticles, wherein the composite particles comprise at least one organically based material containing or being made of at least one wax and an inorganically based material, and to a method for the production thereof and to the use thereof.

10 Claims, No Drawings

PARTICULATE WAX COMPOSITES AND METHOD FOR THE PRODUCTION THEREOF AND THE USE THEREOF

CROSS-REFERENCES TO RELATED APPLICATIONS

This application is a National Stage filing of International Application PCT/EP 2009/002217, filed Mar. 26, 2009, claiming priority to German Application No. DE 10 2008 021 006.4 filed Apr. 25, 2008, entitled "PARTICULATE WAX COMPOSITES AND METHOD FOR THE PRODUCTION THEREOF AND THE USE THEREOF." The subject application claims priority to PCT/EP 2009/002217, and to German Application No. DE 10 2008 021 006.4, and incorporates all by reference herein, in their entirety.

BACKGROUND OF THE INVENTION

The present invention relates to particulate, wax-containing composite materials ("wax composites" or "wax nanocomposites"), in particular in the form of inorganic-organic hybrid composite materials, and to a process for preparing them, and to the use thereof.

The present invention relates more particularly to inorganic-organic composite particles, in particular composite nanoparticles, the composite particles comprising at least one organic-based material, which comprises or consists of at least one wax, and an inorganic-based material, and to a process for preparing them, and to the use thereof.

The present invention further relates to the use of these composite particles, in particular in coating materials and coating systems, such as, in particular, paints, inks, and the like, in dispersions of all kinds, in plastics, in foams, in cosmetics, in particular nail varnishes, in adhesives, in sealants, etc.

The present invention relates, furthermore, to the use of these composite particles as fillers or ingredients, in particular in the aforementioned systems.

The present invention finally relates to such systems, in particular coating materials and coating systems, such as, in particular, paints, inks, and the like, plastics, foams, and cosmetics, such as, in particular, nail varnishes, which comprise these composite particles.

Additionally provided by the present invention are innovative dispersions which comprise these composite particles in a carrier medium or dispersion medium.

In order to improve the mechanical properties of coating systems and dispersion systems (including, for example, paints, inks such as printing inks, coatings) and of plastics, in particular, specifically, for increasing their wear properties, such as scratch resistance and abrasion resistance, the incorporation of additives and fillers, such as, for example, of waxes or inorganic filler particles (e.g., of what are called nanoparticles), is known in principle to the skilled person.

The inorganic filler particles known from the prior art do indeed, under certain circumstances, improve the scratch resistance of the coating systems (e.g., of paints), in which they are used; however, following application, there may be increased brittleness of the resulting coating film (e.g., of a paint film). In addition, the incorporation of these filler particles often results in unwanted clouding and deficient transparency of the coating system. In addition, relatively high filler contents are frequently necessary in order to achieve the desired effects, and this makes it more difficult to stabilize the resulting dispersion systems, and is also undesirable on cost grounds.

WO 2007/072189 A2 relates to a silylated polymer emulsion which further comprises nanosilicate, and to its use for coating systems. With the emulsions described therein, however, it is not always possible to obtain the desired performance properties.

EP 0 960 871 A2 relates to aqueous preparations for treating mineral construction materials, the aqueous preparations comprising, in addition to an emulsion of a polyfunctional carbosilane and/or condensation product thereof, an emulsion of an organopolysiloxane, and a water-dispersible or water-emulsifiable organic polymer, inorganic nanoparticles in addition.

JP 07138484 A relates to the production of extrudates from a mixture of wax, oils or resins and a pulverulent inorganic material, such as talc or silica, for example. The incorporated additional components are said to have effects including an improved flow capacity in the extrusion operation with the wax.

JP 06166756 A relates to emulsions of finely divided wax particles having particle diameters of 0.1 to 100 µm in an inert liquid, preferably a hydrofluorocarbon, such as perfluoropentane, using hydrophobic silica as emulsifier in amounts of 1 to 20 parts by weight per 100 parts by weight of wax. The hydrophobized silica, which is employed solely as an emulsifier, is obtained by reacting the surface of hydrophilic silica with a hydrophobizer, in particular halogenated alkylsilane or alkoxysilane.

JP 2004-339515 A relates to the preparation of precipitated silica having surface-modified properties, the silica prepared in this way being intended for use as a matting agent in paints. The surface modification takes place by treatment of the silica surface with a polyethylene wax, resulting in wax-coated silica particles.

KR 10-2004-0098585 A relates to precipitated silica whose surface is coated with a polyorganosiloxane polymer, and also to a process for producing it. The surface-modified silica is intended to be used as a matting agent for transparent coating materials.

Furthermore, KR 10-2005-0094496 A relates to a preparation process for a core/shell polymer latex, in order to improve the degree of coupling between wax particles and latex particles and in that way to simplify the preparation procedure, by removing the need to prepare a wax emulsion beforehand. The preparations prepared in this way are intended to serve as toner compositions for electrophotographic image apparatus, in particular copiers.

WO 95/31508 A1 relates to wax-coated silica particles which are to be used as matting agents.

Furthermore, EP 1 182 233 B1 relates to a method of covering silicas with waxes, the intention being that the silicas described therein should find use as matting agents in paints.

EP 1 204 701 B1 relates to a cured coating on a substrate, featuring a concentration gradient of the filler particles present in the coating such that, within regions of the coating that are close to the surface, the concentration of the incorporated filler particles is greater than the concentration of these particles within the regions of the coating situated beneath. As a result of this, however, because of inhomogeneity in the coating, an improvement is achieved which is only regional, exclusively in the region of the surface.

US 2006/0228642 A1, finally, relates to a process for preparing polymer latex particles with core/shell structure, having an inner wax core and an outer latex shell, the intention being that such particles should be usable in particular for toner compositions.

Wax-containing composite particles for improving the mechanical properties of coating systems, in particular for increasing the wear resistance, have not yet been proposed to date in the prior art.

BRIEF SUMMARY OF THE INVENTION

It is therefore an object of the present invention to provide filler particles of the aforementioned kind, and disperse systems comprising these filler particles, in particular dispersions, which are suitable in particular for use in the aforementioned systems and which at least largely avoid or else at least attenuate the disadvantages associated with the conventional particles, and also to specify a corresponding preparation process for such particles.

A further object of the present invention should be considered that of providing innovative filler particles of the type specified at the outset, which, when incorporated into the system specified at the outset, bring about an efficient performance boost and are suitable in particular for improving mechanical properties of coating systems and dispersion systems (for example, of paints, inks such as printing inks, coatings, etc.) and of plastics, in particular, especially, for increasing the wear properties thereof, in particular the scratch resistance and abrasion resistance, but in particular without adversely affecting other requisite performance properties of these systems (such as, for example, gloss behavior, surface smoothness, adhesion, etc.).

In order to solve the problem outlined above, the present invention thus proposes wax-containing inorganic-organic composite particles, in particular composite nanoparticles.

Further provided with the present invention is a process for preparing the composite particles of the invention.

Further provided by the present invention, in turn, is the inventive use of the composite particles according to the present invention.

Further provided by the present invention, in turn, are dispersions which comprise the composite particles of the invention in a carrier medium or dispersion medium.

Additionally provided by the invention, finally, are coating materials and coating systems, in particular paints, inks, and the like, plastics, foams, cosmetics, in particular nail varnishes, adhesives, and sealants which comprise the composite particles of the invention.

DETAILED DESCRIPTION OF THE INVENTION

It will be appreciated that, in the text below, those remarks which relate only to one individual aspect of the present invention also apply, equally and correspondingly, to the other aspects of the present invention, without this fact requiring any explicit mention.

The present invention accordingly provides—according to a first aspect of the present invention—inorganic-organic composite particles, in particular composite nanoparticles, the composite particles comprising at least one organic-based material, which comprises or consists of at least one wax, and an inorganic-based material.

A particular feature of the present invention, first of all, is that inorganic-organic hybrid particles or composite particles of a wax-based organic material on the one hand and an inorganic material are provided. Composite particles of this kind had not been provided to date. These particles unite the positive properties of the waxes on the one hand and of the respective inorganic material, in particular of inorganic nanoparticles, on the other hand, in a single structure or in a single particle, and, on their incorporation as filler particles into coating materials and coating systems of the aforementioned kind, result in a significant improvement in the mechanical properties, in particular in an increase in the wear resistance, in particular the scratch resistance and/or the abrasion resistance, and do so while substantially retaining, or in certain circumstances even improving, the other requisite performance properties (such as, for example, surface smoothness, gloss, etc.). Moreover, the composite particles of the invention can be incorporated homogeneously and stably into the aforementioned systems. Their incorporation into the aforementioned systems, in particular into Coating materials and coating systems, such as paints, inks, and the like, leads in particular to no clouding of the systems in question.

As far as the composite particles of the invention are concerned, these composite particles generally have particle sizes of 1 to 2000 nm, in particular 1 to 1000 nm, preferably 2 to 750 nm, more preferably 5 to 600 nm, very preferably 10 to 500 nm. The particle size may be determined, for example, by means of transmission electron microscopy, analytical ultracentrifugation or methods of light scattering.

The inorganic-based material of the composite particles is present in particular in the form of inorganic nanoparticles, in particular with particle sizes of the inorganic nanoparticles in the range from 0.5 to 750 nm, in particular 1 to 500 nm, preferably 2 to 250 nm, more preferably 5 to 150 nm, very preferably 10 to 100 nm, the particle size being determinable, for example, by means of transmission electron microscopy, analytical ultracentrifugation or methods of light scattering. On these inorganic particles, the organic material, comprising or consisting of wax, may be deposited.

It will be appreciated that, for all of the size indications and range indications specified in the context of the present, invention, it may be necessary, for an individual case or for a particular application, to deviate therefrom, without departure from the scope of the present invention.

In particular, the composite particles comprise the organic-based material on the one hand and the inorganic-based material on the other hand in an intimate and/or stable assembly. The organic-based material may preferably be deposited on the inorganic-based material (e.g., by precipitation), as described in detail below.

As far as the respective fractions of inorganic material on the one hand and organic material on the other hand in the composite particles of the invention are concerned, these fractions may vary within wide ranges; generally speaking, the weight-based ratio of organic-based material, in particular wax, to inorganic-based material in the composite particles varies in the range from 1:50 to 200:1, in particular 1:20 to 100:1, preferably 1:1 to 50:1.

As far as the inorganic-based material of the composite particles of the invention is concerned, it may be formed of at least one inorganic oxide (e.g., $TiO_2$, $ZnO$, $Al_2O_3$, $SiO_2$, $CeO_2$, $Fe_2O_3$, $Fe_3O_4$, etc.), hydroxide (e.g., $Al[OH]_3$ etc.), oxide hydroxide (e.g., AlOOH etc.), sulfate (e.g., alkaline earth metal sulfates, such as barium sulfate, calcium sulfate, etc.), phosphate (e.g., alkaline earth metal phosphate, such as calcium phosphate, or lanthanum phosphate, etc.), sulfide (e.g., cadmium sulfide, zinc sulfide, etc.), carbonate (e.g., alkaline earth metal carbonate, such as magnesium carbonate, or calcium carbonate, etc.), nitride (e.g., AlN, $Si_3N_4$, etc.), silicate (e.g., alkaline earth metal silicate, such as calcium silicate etc., sheet silicates and phyllosilicates, etc.), carbide (e.g., SiC etc.), single-wall or multiwall carbon nanotubes and/or metal/element (e.g., silver, copper, fullerene), or else of mixtures or combinations of such compounds, or may comprise said compound(s).

Advantageously the aforementioned inorganic-based material from the group of inorganic oxides, hydroxides, oxide hydroxides, sulfates, phosphates, sulfides, carbonates, nitrides, silicates, carbides and/or metals/elements is of low-solubility form in the respective medium.

In particular, the inorganic-based material may be formed of at least one oxide, hydroxide, oxide hydroxyide, sulfate, phosphate, sulfide, carbonate, nitride, silicate, carbide of at least one metal or semimetal or else of metals or else of mixtures or combinations of such compounds, or may comprise said compound(s).

The inorganic-based material of the composite particles of the invention may preferably be formed of at least one oxide, hydroxide and/or oxide hydroxide of aluminum, of silicon, of zinc, of titanium, of cerium and/or of iron, an alkaline earth metal sulfate, an alkaline earth metal phosphate or lanthanum phosphate, a cadmium sulfide or zinc sulfide, an alkaline earth metal carbonate, an aluminum nitride or silicon nitride, an alkaline earth metal silicate, a silicon carbide, carbon nanotubes or silver, or else of mixtures or combinations of such compounds, or may comprise said compound(s).

Particular preference for forming the inorganic-based material of the composite particles of the invention is given to the following compounds: $TiO_2$, $ZnO$, $Al_2O_3$, $SiO_2$, $CeO_2$, $Fe_2O_3$, $Fe_3O_4$, $Al(OH)_3$, $Al(O)OH$, alkaline earth metal sulfates (e.g. barium sulfate, calcium sulfate, etc.), alkaline earth metal phosphates (e.g., calcium phosphate), lanthanum phosphate, cadmium sulfide, zinc sulfide, alkaline earth metal carbonate (e.g., magnesium carbonate, calcium carbonate, etc.), AlN, $Si_3N_4$, alkaline earth metal silicates (e.g., calcium silicate etc.), SiC and/or silver, and also mixtures or combinations of such compounds.

It is especially preferred if the inorganic-based material is formed of aluminum oxide, silicon dioxide, zinc oxide and/or titanium dioxide, or comprises said compound(s).

It is even more preferred if the inorganic-based material of the composite particles of the invention is formed of silicon dioxide (e.g., in the form of, in particular, highly disperse $SiO_2$ or polysilicas) or aluminum oxide.

As far as the organic-based material of the composite particles of the invention is concerned, this organic-based material is formed of at least one wax or comprises such a wax. In this case the wax may in particular be selected from the group of (i) natural waxes, in particular plant, animal, and mineral waxes; (ii) chemically modified waxes; (iii) synthetic waxes; and also mixtures thereof.

In accordance with one particularly preferred embodiment of the present invention, organic-based material of the composite particles of the invention that is used is a synthetic wax, in particular a polyolefin-based wax, preferably a wax based on an oxidized polyolefin.

As far as the concept of the wax is concerned, the term is a phenomenological designation for a series of substances which are obtained naturally or artificially or synthetically and which in general have the following properties: waxes are kneadable at 20° C., solid to brittly hard, coarsely to finely crystalline, translucent to opaque, but not glassy, melting above 40° C. without decomposition, but being of relatively low viscosity even a short way above the melting point, and, in general and advantageously, are non-stringing, exhibit a strongly temperature-dependent consistency and solubility, and are polishable under gentle pressure. If more than one of the properties quoted above is absent, this substance, according to the DGF (Deutsche Gesellschaft für Fettwissenschaften), is not a wax (cf. DGF Standard Method M-I 1 (75)).

Waxes differ from similar synthetic or natural products (e.g., resins, plastic masses, metal soaps, etc.) primarily in that in general, approximately between 50 and 90° C., in exceptional cases even up to approximately 200° C., they undergo transition to the liquid-melt, low-viscosity state and are virtually free from ash-forming compounds.

Waxes form pastes or gels and burn generally with a sooty flame.

According to their origin, the waxes are divided into three groups, namely (i) natural waxes, including plant waxes (e.g., candelilla wax, carnauba wax, japan wax, esparto grass wax, cork wax, guaruma wax, rice germ oil wax, sugar cane wax, ouricury wax, montan wax, etc.), animal waxes (e.g., beeswax, shellac wax, spermaceti, lanolin or wool wax, uropygial grease, etc.), and mineral waxes (e.g., ceresin, ozokerite or earth wax, etc.); (ii) chemically modified waxes, including hard waxes (e.g., montan ester waxes, Sasol waxes, hydrogenated jojoba waxes, etc.); and (iii) synthetic waxes, including polyalkylene waxes, polyalkylene glycol waxes (e.g., polyethylene glycol waxes), etc.

Principal constituents of natural recent ("renewable") waxes are esters of long-chain fatty acids (wax acids) with long-chain fatty alcohols, triterpene alcohols or steroid alcohols; these wax esters also contain free carboxyl and/or hydroxyl groups, which cause the so-called wax soaps to have emulsifying capacity. Natural fossil waxes, such as from lignite or petroleum, for example, consist primarily—like waxes from the Fischer-Tropsch synthesis or polyalkylene waxes (e.g., polyethylene waxes)—of straight-chain hydrocarbons; the former, however, depending on provenance, may also comprise branched or cycloaliphatic hydrocarbons. Frequently these "hydrocarbon" waxes are functionalized by subsequent oxidation or else, in the case of the polyolefin waxes, by comonomers with carboxyl groups.

For further details regarding the concept of waxes, reference may be made, for example, to Römpp Chemielexikon, 10th edition, volume 6, 1999, Georg Thieme Verlag Stuttgart/New York, page 4906, entry heading: "Wachse" [Waxes], and also to the literature referenced therein, especially Cosm. Toil. 101, 49 (1986), and also DGF standard methods, division M—waxes and wax products, 7th supplement 05/1999, Stuttgart: Wissenschaftliche Verlagsgesellschaft, the aforementioned literature references being hereby included by reference in their entirety in the present specification.

It is preferred in accordance with the invention if organic-based material used is a wax which comprises functional groups which are capable of interacting with the inorganic-based material, in particular of forming physical and/or chemical bonds therewith.

The functional groups are preferably polar groups, in particular groups which contain heteroatoms from the group of O, N and/or S, preferably O, preferably hydroxyl groups, polyether groups, in particular polyalkylene oxide groups, and/or carboxyl groups, very preferably polyether groups and/or hydroxyl groups. The functional groups of these waxes bring about or increase the affinity of the wax material for the inorganic material, and hence permit improved or more stable adhesion.

According to one particular embodiment, provision may be made for the inorganic-based material of the inorganic-organic composite particles of the invention to be of surface-modified design, with such surface modification taking place advantageously by means of polysiloxane groups, in particular by means of optionally organically modified polysiloxane groups; in other words, at or on the surface of the inorganic-based material of the composite particles of the invention, in this embodiment, polysiloxane groups are applied, preferably by means of physical and/or chemical bonding, in particular chemical covalent bonding.

The corresponding surface modification by means of polysiloxane groups, in particular by means of optionally organically modified polysiloxane groups, has the effect of an even further increase or improvement in the performance properties of the composite particles of the invention, in particular when they are incorporated as fillers into coating materials and coating systems. In particular, the surface modification, preferably with polysiloxane groups, results in reduced sedimentation propensity and gel-forming propensity of dispersions which obtain the composite particles of the invention. In addition, embrittlement of the dried and/or cured coating system is efficiently counteracted. A further advantage of the surface modification is that, on incorporation of the composite particles of the invention as filler particles into dispersion systems, interaction with the binder is advantageously influenced, and in this way transparency and refractive index are improved still further relative to non-surface-modified particles, and in particular, as a consequence of the reduced difference in refractive index, there is significantly less light scattering.

The surface modification, in particular by means of polysiloxane groups, preferably by means of optionally organically modified polysiloxane groups, is known in principle to the skilled person from the prior art. In this respect, reference may be made to the patent applications DE 10 2005 006 870 A1 or EP 1 690 902 A2 and DE 10 2007 030 285 A1 or PCT/EP 2007/006273, which originate from the applicant, itself, and whose total disclosure content is hereby incorporated by reference. All aforementioned publications relate to the surface modification of metal- or semimetal-oxidic or hydroxidic surfaces by means of polysiloxanes, advantageously through formation of chemical, in particular covalent, bonds.

Further provided by the present invention—in accordance with a second aspect of the present invention—is a process for preparing the inorganic-organic composite particles of the invention, as described above, where, in this process, at least one organic-based material which comprises or consists of at least one wax, and an inorganic-based material, are precipitated jointly from a medium comprising them, and/or at least one organic-based material which comprises or consists of at least one wax is deposited on an inorganic-based material, resulting in composite particles of the invention of organic-based material which comprises or consists of at least one wax, and of inorganic-based material.

The composite particles of the invention are obtainable in particular by joint precipitation ("coprecipitation") of organic-based and inorganic-based material and/or obtainable by deposition of organic-based material on inorganic-based material, in particular of wax onto inorganic particles, preferably onto inorganic nanoparticles.

As far as the process of the invention for preparing the inorganic-organic composite particles according to the present invention is concerned, the procedure followed, in accordance with the invention, is therefore such that at least one organic-based material consisting of or comprising a wax, and an inorganic-based material, are precipitated jointly from a medium comprising them, and/or that at least one organic-based material consisting of or comprising at least one wax is deposited on an inorganic-based material or is intimately mixed therewith.

The medium in which the process of the invention is carried out may be admixed, as well as with the aforementioned starting materials (i.e., wax-containing, organic-based material on the one hand and inorganic-based material on the other hand), if desired, with further ingredients and/or additives, which in particular may be selected from the group of emulsifiers (e.g., ionic, such as anionic or cationic, or else non-ionic emulsifiers, etc.) wetting agents, antioxidants, stabilizers, neutralizing agents (e.g., hydroxides, amines, etc.), catalysts, thickeners, dispersants, biocides or the like, and also mixtures of these compounds.

In the context of the process of the invention, the procedure is such that, following precipitation, composite particles of the invention result with particle sizes in the range from 1 to 2000 nm, in particular 1 to 1000 nm, preferably 2 to 750 nm, more preferably 5 to 600 nm, very preferably 10 to 500 nm.

The inorganic-based material is used in particular in the form of inorganic particles, in particular inorganic nanoparticles, in particular with particle sizes of the inorganic nanoparticles in the range from 0.5 to 750 nm, in particular 1 to 500 nm, preferably 2 to 250 nm, more preferably 5 to 150 nm, very preferably 10 to 100 nm. On these particles the organic material, in particular a wax, is then applied or deposited.

In general, in accordance with the invention, the procedure is such that the starting materials are used in a weight-based ratio of organic-based material, in particular wax, to inorganic-based material in the range from 1:50 to 200:1, in particular 1:20 to 100:1, preferably 1:1 to 50:1.

In accordance with a first variant of the process of the invention, a procedure may be adopted such that first of all a preferably aqueous emulsion of wax particles is prepared in the presence of inorganic particles dispersed in this emulsion, in particular inorganic nanoparticles, as defined above, and this may take place in particular with heating to temperatures above the melting temperature of the wax particles, and subsequently the emulsion is cooled, in particular below temperatures of the melting temperature of the wax particles, and so the wax is deposited on the inorganic particles, with formation of the inorganic-organic composite particles of the invention, or is intimately mixed with them. Cooling may take place, for example, with introduction of additional, cooled medium (e.g., water, optionally together with further additives).

In accordance with a second variant of the process of the invention it is possible, alternatively, to prepare first of all a solution of at least one wax in the presence of inorganic particles dispersed in this solution, in particular inorganic nanoparticles, as defined above, and subsequently to introduce a precipitant into the wax solution with the inorganic particles dispersed therein, and so the wax is precipitated and is deposited on the inorganic particles, with formation of the inorganic-organic composite particles of the invention, or is intimately mixed with them.

In accordance, in turn, with a further, third variant of the process of the invention it is possible—again alternatively—to adopt an approach in which first of all a solution of at least one wax is prepared and subsequently a dispersion of inorganic particles, in particular inorganic nanoparticles, is introduced into a precipitant for the wax, and so, as a result, the wax is precipitated and is deposited on the inorganic particles, with formation of the inorganic-organic composite particles of the invention, or is intimately mixed with them.

For the reasons given above it is particularly preferred in accordance with the invention if the inorganic-based material used, in particular the inorganic particles, preferably the inorganic nanoparticles, is subjected to a surface modification, in particular by application of polysiloxane groups. For further details in this regard, reference may be made to the statements above.

As far as the inorganic material used is concerned, reference may be made, in order to avoid unnecessary repetitions, to the statements above concerning the composite particles of the invention, which apply equally in relation to the process of the invention.

As far as the wax used is concerned, reference may be made, in this regard, in order to avoid unnecessary repetitions, to the above statements concerning the composite particles of the invention, which apply correspondingly in relation to the preparation process of the invention.

In the context of the present invention it is possible in particular to use micronized waxes, which are then joined, in a manner in accordance with the invention, to the inorganic material, in particular deposited thereon, in order to prepare the composite particles of the invention.

Additionally provided by the present invention—according to a third aspect of the present invention—is the use of the composite particles of the invention as fillers. The composite particles of the invention can be used in particular in coating materials and coating systems, in particular paints, inks, and the like, in dispersions of all kinds, in plastics, in foams, in cosmetics, in particular nail varnishes, in adhesives, and also in sealants, in particular therein in their capacity as fillers or ingredients or additives.

The composite particles of the invention can be used in particular for contributing to improving the mechanical properties, in particular to increasing the wear resistance, preferably the scratch resistance and/or abrasion resistance, in the aforementioned systems.

Further provided by the present invention—in accordance with a fourth aspect of the present invention—are dispersions which comprise the composite particles of the invention in a carrier medium or dispersion medium.

Finally, additionally provided by the present invention—in accordance with a fifth aspect of the present invention—are coating materials and coating systems, in particular paints, inks, and the like, plastics, foams, cosmetics, in particular nail varnishes, adhesives, and sealants which comprise the composite particles of the invention.

With the composite particles of the invention, for the first time, organic-inorganic-based hybrid particles or composite particles have been provided which, when incorporated into the aforementioned systems, result in a significant performance boost, in particular in a significant improvement in the mechanical properties, in particular the wear resistance, preferably the scratch resistance and/or abrasion resistance.

Through the present invention, success has been achieved for the first time in uniting the performance advantages of inorganic-based nanoparticles on the one hand and wax-containing particles on the other hand, in a single composite material. The effect of the composite particles of the invention in particular, when incorporated into the aforementioned systems (i.e. coating materials and coating systems, in particular paints, inks or the like, plastics, foams, cosmetics, in particular nail varnishes, adhesives, and sealants), is an efficient performance boost, and they are suitable in particular for improving the mechanical properties of such systems, in particular wear properties, such as scratch resistance and abrasion resistance, but in particular without adversely affecting other requisite performance properties of these systems (e.g., gloss behavior, surface smoothness, adhesion capacity, etc.).

In this way, an effective filler for the aforementioned systems is provided which, for example, when incorporated into coating systems (e.g., paints and inks), improves the mechanical properties of the coating, such as abrasion resistance and scratch resistance, for example, without adversely affecting the gloss. In accordance with the prior art, in contrast, wax-containing dispersions or micronized waxes, for example, do result in an improvement in the mechanical properties, in particular the abrasion resistance, but have the disadvantage of an unwanted matting effect.

Through the provision of the composite particles of the invention, success has been achieved, moreover, in dispersing inorganic-based nanoparticles stably in a wax emulsion or wax dispersion. In contrast, according to the present state of the art, inorganic nanoparticle dispersions are typically incompatible with wax-based formulations, and in this form at least, therefore, are not obtainable in accordance with the present state of the art.

As a result of introduction of the inorganic nanoparticles into the composite materials of the invention, the inorganic nanoparticles are also stabilized efficiently in the dispersion state. According to the prior art, in contrast, the large density difference between inorganic nanoparticles on the one hand and waxes on the other hand makes it impossible or very difficult to produce a stable product. Dispersions of the composite particles of the invention, in contrast, are stable over a relatively long time and tend toward a sedimentation behavior which is significantly reduced as compared with that of the pure inorganic nanoparticles; in other words, within the composite particles of the invention, the inorganic nanoparticles remain stably dispersed, in particular in a manner which is stable with respect to sedimentation.

As described above, the composite particles of the invention—in comparison in each case with pure wax emulsions or with pure inorganic nanoparticle dispersions, or else with mixtures thereof—result in improved mechanical properties on the part of coatings and—in comparison with purely wax-based systems—do not substantially detract from the gloss characteristics of the resultant coatings.

In comparison to the individual constituents, i.e., wax on the one hand and inorganic nanoparticles on the other hand, or their purely physical mixtures, the composite materials of the invention exhibit a synergistic effect, in particular in relation to the mechanical properties of the coatings, and so it is possible to achieve a significant reduction in the amount of composite particles of the invention in comparison to the pure materials, in particular in comparison to pure inorganic nanoparticle dispersions.

In comparison to mineral filler particles of the prior art which are composed of the mineral material in bulk, moreover, the composite particles of the invention have significantly lower densities or intrinsic weights. The consequence of this is that, in order to obtain comparable properties and/or effects, significantly lower weight quantities of the composite particles of the invention need to be used, in comparison to pure mineral filler particles, since the mechanical properties of the systems in question are determined by the volume fraction of the filler particles. As well as a considerable cost saving, this also results in more highly performing dispersions, which are improved in their handling as a consequence of the reduced filler content.

Furthermore, purely inorganic filler particles of the prior art have the disadvantage that they have high refractive indices as compared with a pure binder, and so their incorporation into the binders in question results in clouding or reduction in gloss. This phenomenon is not observed with the composite particles of the invention—that is, their incorporation into the binder systems in question leads to no significant clouding, since, in comparison to conventional mineral filler particles, for the reasons given above, significantly smaller quantities of the composite particles of the invention are required.

In addition, the filler particles of the invention can easily be incorporated stably, in particular with long-term stability and phase stability, into the systems in question, without any significant separation or else accumulation on the surface. As a result, the performance boost is achieved uniformly over the system as a whole.

The application possibilities for the composite particles of the invention and for the dispersions of the invention are extremely broad. The broad capacity for application in combination with the extremely high efficiency of the composite particles of the invention and of the dispersions of the invention far exceed particles and dispersions of the prior art.

The composite particles and dispersions of the invention can be employed, for example, by addition to existing systems which are processed further, for example, to give paints, adhesives, plastics, etc. Through the addition even of small quantities of the composite particles of the invention or of the dispersions of the invention, an exceptionally increased mechanical resistance is obtained. Surprisingly, the other processing properties of the systems in question, in particular paints, plastics, etc., are not, or not significantly, influenced, and so there is no need for new optimization of the other parameters in the case of these applications.

The composite particles of the invention and dispersions thereof are therefore outstandingly suitable for use in coating materials of all kinds, plastics, adhesives, sealants, etc.

Further embodiments, modifications, and variations of the present invention are readily discernible and realizable for the skilled person from a reading of the description, without departure from the scope of the present invention.

The present invention is illustrated using the working examples which follow, and which are not intended in any way to restrict the present invention.

WORKING EXAMPLES

Example 1

Preparation of Organic-Inorganic Wax/$Al_2O_3$ Composite Particles and their Use 303 g of oxidized HDPE wax were mixed together with 80 g of an $Al_2O_3$ dispersion (50% in water) with a particle size of about 40 nm and 70 g of anionic emulsifier, 34 g of diethylethanolamine (neutralizing agent), 4 g of sodium sulfite (antioxidant), and 315 g of water, and the mixture was heated to a temperature of 145° C. The whole mixture was held at this temperature for 15 minutes.

Waxes suitable in accordance with the invention and used in the context of the tests typically possess melting points in the range from 125 to 140° C. and acid numbers in the range from 10 to 40 KOH/g. For example, an HDPE wax emulsion of the AQUACER® 513 type from BYK-Chemie GmbH, Germany, can be used.

Subsequently, 175 g of water and 19 g of diethylethanolamine were heated to 80° C. and injected into the mixture described above. The whole mixture was then cooled to a temperature of 40° C.

This gave an emulsion of wax/$Al_2O_3$ composite nanoparticles. As a result of the formation of the particulate composite structure, the sedimentation behavior of the inorganic nanoparticles was significantly improved, and this is manifested in the virtual absence of or significant reduction in sedimentation of particles, constituting a considerable improvement over the original $Al_2O_3$ nanoparticle dispersion, and entailing improved handling properties.

The wax/$Al_2O_3$ composite nanoparticle system obtained in this way was subsequently incorporated into a two-component PU coating system (amount of wax/$Al_2O_3$ composite nanoparticles, calculated as $Al_2O_3$ and based on the coating composition: 4% by weight) and then tested for its performance properties in relation to the coating, particularly gloss, scratch resistance, and lubricity. Relative to a pure wax emulsion or else to a pure nanoparticle dispersion, the composite particles of the invention exhibit improved scratch resistance and abrasion resistance without restriction on the gloss characteristics of the resultant coatings, relative to pure wax dispersions. In addition, the surface smoothness is not adversely affected. The results are summarized in the table below.

Example 2

Preparation of Organic-Inorganic Wax/$Al_2O_3$ Composite Particles and their Use Example 1 was repeated, but with the modification that the wax was dissolved in xylene and, following addition of the $Al_2O_3$ dispersion and of the other ingredients, butyl acetate was added as precipitant in amounts such that wax/$Al_2O_3$ composite nanoparticles were precipitated and obtained. The subsequent process steps, accordingly, are omitted.

The wax/$Al_2O_3$ composite nanoparticle system obtained in this way was also subjected to the aforementioned performance tests, and the results are summarized in the table below.

Example 3

Preparation of Organic-Inorganic Wax/$Al_2O_3$ Composite Particles and their Use Example 2 was repeated here, but with the modification that the addition of the precipitant for the wax took place as part of the addition of the $Al_2O_3$ dispersion, through the use of a butyl acetate-based $Al_2O_3$ dispersion.

The wax/$Al_2O_3$ composite nanoparticle system obtained in this way was also subjected to the aforementioned performance tests, and the results are summarized in the table below.

Examples 4 to 6

Preparation of Organic-Inorganic Wax/$SiO_2$ Composite Particles and their Use

Examples 1 to 3 above were repeated, but with the modification that the $Al_2O_3$ nanoparticles were replaced by $SiO_2$ particles having particle sizes of about 40 nm.

The wax/$SiO_2$ composite nanoparticle systems obtained in this way were also subjected to the aforementioned performance tests, and the results are summarized in the table below.

Performance Tests:

With the exception of the control sample and of the samples coated with the pure wax, all other samples comprise, in the coating composition (dry weight), the above-described filler particles in amounts of 4% by weight, based on the coating composition or coating dispersion used, and calculated as inorganic nanoparticles (i.e., aluminum oxide particles or silicon dioxide particles, respectively).

The scratch resistance was determined by the Satra test method after 500, 1000, 2000, and 4000 cycles, the resultant abrasion resistance being evaluated in accordance with a school-grade system, with evaluation grades from 1 to 5 (1=very good to 5=inadequate). For this purpose, each of the coatings was applied in the same coat thickness and was left to dry and cure under the same conditions for 24 hours.

Subsequently, after a further three days of storage, the Satra scratch resistance test is carried out under conditions that are known per se to the skilled person, by means of an abrasion disk rotating on the surface of the coatings, with the aforementioned cycles.

The gloss value was determined in accordance with DIN EN 67530, corresponding to ISO 2813, at an angle of 60°.

The surface smoothness ("slip") was measured by measuring the slip properties via the percentage reduction in slip resistance. In this measurement method, the frictional force of a defined object on the coating surface is measured; a 500 g stone weight having a defined felt underlay is pushed by a tensile machine over the paint surface at a constant speed. The force required to achieve this is measured by an electronic force transducer. Relative to a control sample, the reduction in the force required, in percent in comparison to the control sample, is calculated from the force values. In the case of positive values, the sample is smoother than the control, and, in the case of negative values, the sample is rougher than the control. In the present case, very low values are desired.

The abrasion resistance was determined by the Taber abrasion method in accordance with ASTM D 4060 (the weight loss is reported) under a load of 500 g. The parameter reported is the loss of mass in mg.

Reproduced below is the table with the test results.

| Coating composition | Scratch resistance (Satra) | | | | Gloss (60°) | Surface smoothness ("slip") | Taber abrasion resistance (mg) |
|---|---|---|---|---|---|---|---|
| | 500 cycles | 1000 cycles | 2000 cycles | 4000 cycles | | | |
| Control | 5 | 5 | 5 | 5 | 87.1 | — | — |
| Pure $Al_2O_3$ dispersion (Ø = 40 nm) (comparative) | 1-2 | 2 | 4-5 | 5 | 84.5 | −14.3% | 12.3 |
| Pure wax emulsion (comparative) | 2-3 | 5 | 5 | 5 | 79.0 | +4.29% | 7.2 |
| Ex. 1 | 1 | 1-2 | 1-2 | 2-3 | 86.9 | −14.5% | 4.3 |
| Ex. 2 | 1 | 1-2 | 2 | 3 | 87.0 | −17.1% | 3.8 |
| Ex. 3 | 1-2 | 1-2 | 1-2 | 3 | 87.0 | −28.6% | 4.5 |
| Ex. 4 | 1 | 1-2 | 2 | 2-3 | 86.7 | −22.5% | 4.0 |
| Ex. 5 | 1 | 1-2 | 2 | 3 | 86.8 | −19.8% | 4.5 |
| Ex. 6 | 1-2 | 2 | 2-3 | 3-4 | 86.2 | −14.4% | 5.1 |

The above results show that significant improvements can be achieved in the abrasion resistance and scratching resistance through the incorporation of the particles of the invention. Moreover, the incorporation of the particles of the invention in the above-specified amounts does not result in any significant deterioration at all in the other performance properties.

The tests above impressively demonstrate the enhanced performance capacity of the inventive systems and particles.

The invention claimed is:

1. A dispersion or carrier comprising inorganic-organic composite particles in the form of composite nanoparticles having particle sizes in the range from 1 to 1000 nm, the composite particles comprising at least one organic-based material, which consists of at least one wax, and an inorganic-based material;
    wherein the organic-based material is deposited on the inorganic-based material,
    wherein the weight-based ratio of organic-based material to inorganic-based material in the composite particles varies in the range from 1:1 to 50:1;
    wherein the inorganic-based material of the composite particles is present in the form of inorganic nanoparticles with particle sizes of the inorganic nanoparticles in the range from 0.5 to 750 nm;
    wherein the inorganic-based material of the composite particles is selected from the group consisting of aluminum oxide and silicone dioxide;
    wherein the organic-based material of the composite particles is formed of at least one wax, wherein the wax is selected from the group of (i) natural waxes; (ii) chemically modified waxes; (iii) synthetic waxes; and also mixtures thereof,
    wherein the organic-based material of the composite particles comprises functional groups which are capable of interacting with the inorganic-based material and of forming physical and/or chemical bonds therewith;
    wherein the functional groups are polar groups which contain heteroatoms from the group of O, N and/or S; and
    wherein the concentration of inorganic-organic composite particles is between 0.5 and 10% by weight of the dispersion or carrier.

2. The dispersion or carrier as claimed in claim 1, wherein the composite particles have particle sizes in the range from 2 to 750 nm.

3. The dispersion or carrier as claimed in claim 1, wherein the inorganic-based material of the composite particles is present in the form of inorganic nanoparticles with particle sizes of the inorganic nanoparticles in the range from 1 to 500 nm.

4. The dispersion or carrier as claimed in claim 1, wherein the functional groups are selected from hydroxyl groups, polyether groups, polyalkylene oxide groups, and/or carboxyl groups.

5. The dispersion or carrier as claimed in claim 1, wherein the inorganic-based material of the composite particles is surface-modified.

6. The dispersion or carrier as claimed in claim 1, wherein the inorganic-based material of the composite particles is surface-modified by means of polysiloxane groups.

7. The dispersion or carrier as claimed in claim 1, wherein the composite particles are obtained by joint precipitation or co-precipitation of organic-based and inorganic-based material via deposition of the organic-based material on the inorganic-based material.

8. A process for preparing a dispersion or carrier as claimed in claim 1 comprising inorganic-organic composite nanoparticles, wherein at least one organic-based material which consists of at least one wax, and an inorganic-based material, are precipitated jointly from a medium comprising them;
- wherein the starting materials are used in a weight-based ratio of organic-based material to inorganic-based material in the range from 1:1 to 50:1;
- wherein the inorganic-based material is used in the form of inorganic nanoparticles with particle sizes of the inorganic nanoparticles in the range from 0.5 to 750 nm;
- wherein inorganic-based material used is selected from the group consisting of aluminum oxide and silicone dioxide
- wherein organic-based material used is at least one wax selected from the group consisting of (i) natural waxes; (ii) chemically modified waxes; (iii) synthetic waxes; and mixtures thereof; and
- wherein the organic-based material used comprises functional groups which contain heteroatoms from the group of O, N and/or S; which are capable of interacting with the inorganic-based material and of forming physical and/or chemical bonds therewith.

9. A coating material comprising the dispersion or carrier of claim 1.

10. The coating materials of claim 9, wherein the coating materials are selected from the group consisting of paints, inks, plastics, foams, cosmetics, nail varnishes, adhesives, and sealants.

* * * * *